Feb. 7, 1967 K. IKRATH 3,302,745
GENERATION AND RECEPTION OF LOW FREQUENCY SEISMIC WAVES
Filed Feb. 6, 1964

INVENTOR,
KURT IKRATH.

BY Harry M. Saragovitz
Edward J. Kelly, Herbert Berl
& Julian C. Kippler
ATTORNEYS

United States Patent Office 3,302,745
Patented Feb. 7, 1967

3,302,745
GENERATION AND RECEPTION OF LOW
FREQUENCY SEISMIC WAVES
Kurt Ikrath, Elberon, N.J., assignor to the United States of America as represented by the Secretary of the Army
Filed Feb. 6, 1964, Ser. No. 343,161
4 Claims. (Cl. 181—.5)

The invention described herein may be manufactured and used by or for the Government for governmental purposes without the payment of any royalty thereon.

The present invention relates to the generation and reception of low frequency seismic waves and more particularly to a novel method and apparatus for producing low frequency mechanical or seismic waves within the earth by heterodyning or beating two relatively high frequency seismic waves and also to novel means for receiving or detecting such low frequency seismic waves. The low frequency waves produced are capable of long distance transmission through the earth since the attenuation at the resultant subsonic frequency is small. One of the two relatively high frequency waves used to generate the low frequency waves may be modulated in frequency, phase or amplitude in accordance with intelligence to be transmitted through the earth and the modulation will be transferred to the low frequency wave in the heterodyne process. Thus the invention may be utilized as a seismic communication system. The low frequency seismic wave may also be utilized, either modulated or unmodulated, for studying the geophysical properties of the earth, for example to measure seismic wave velocities, to map subsurface strata, to map subsurface analomies and faults or to measure ice thickness.

It is therefore an object of the invention to provide a novel and useful apparatus for generating and receiving low frequency seismic waves.

It is a further object of the invention to provide a method and apparatus for generating low frequency seismic waves by heterodyning two relatively high frequency seismic waves within the earth.

A further object of the invention is to provide novel and useful apparatus for generating seismic waves of subsonic frequency.

A further object is to provide novel and useful apparatus for receiving or detecting subsonic seismic waves.

Figure 1:
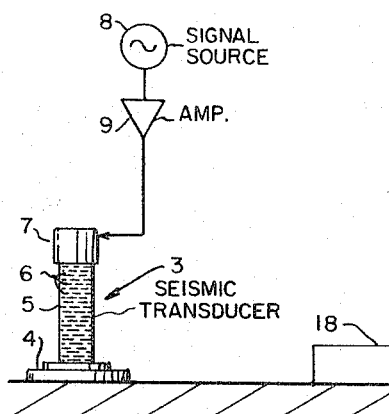
Figure 1:
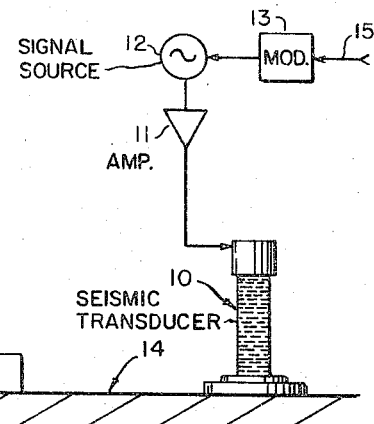
Figure 2:
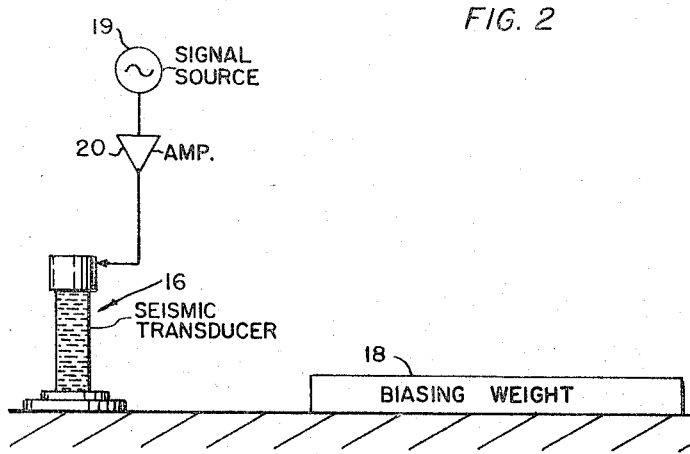
Figure 2:
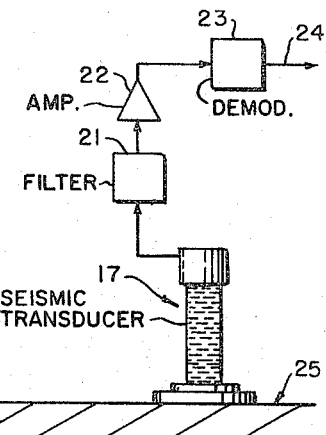

Other objects and advantages of the invention will become apparent from the following detailed description and drawings, in which:

FIG. 1 is a schematic diagram of apparatus for the launching or transmitting of low frequency seismic waves, and FIG. 2 is a schematic diagram of apparatus for the reception or detection of low frequency seismic waves.

In FIG. 1 elements 3 and 10 are tuned seismic transducers which convert alternating current electrical signals to mechanical vibrations which are in turn coupled to the earth as seismic waves. The output of alternating current signal source 8 is applied to amplifier 9 and thence to seismic transducer 3 which produces seismic waves of frequency corresponding to signal source 8. A second similar seismic transducer 10 rests on the earth 14 a short distance away. Transducer 10 is driven by the output of signal source 12 which is made slightly different in frequency from source 8. The heterodyning or beating of the two seismic waves within the earth produces sum and difference seismic frequencies. The two original frequencies and the sum frequency will be rapidly attenuated in traveling through the earth, but the difference frequency can be chosen in the subsonic region (below 20 c.p.s.) where the earth attenuation is low and hence long distance propagation possible. If the apparatus is to be used as a seismic communication system, either one of the sources 8 or 12 may be modulated in frequency, phase, or amplitude, in accordance with the intelligence to be transmitted and the resultant subsonic frequency beat note will be correspondingly modulated. A modulator 13 is shown connected to signal source 12 for this purpose. The intelligence is applied to modulator 13 over lead 15.

It is well known that a non-linear medium is required for heterodyning. The earth is a generally linear elastic medium, that is, over a range of applied compressional forces or stresses the strain or deformation is proportional to the stress. However above the elastic limit the relation between stress and strain is no longer linear. In order for the apparatus of FIG. 1 to function as described it is necessary to bias the earth into the non-linear stress-strain region in the vicinity of the two transducers. In some areas natural internal stresses will be present which will provide the biasing stress which makes it possible to heterodyne the two seismic waves. In other areas the stressing of the earth caused by the weight of the transducers themselves plus the associated equipment may be sufficient to bias the earth into the non-linear region. In still other areas it may be necessary to load the earth with a weight, for example a slab of metal or stone as illustrated in FIG. 1 by reference numeral 18.

The apparatus of FIG. 2 comprises a seismic receiver capable of detecting the subsonic seismic waves launched by the seismic transmitter of FIG. 1. The tuned seismic transducer 16 rests on the earth 25 and operates as a seismic transmitter, converting the output of alternating current signal source 19 to seismic waves of corresponding frequency. The frequency of signal source 19 is relatively high, for example in the lower portion of the audio frequency spectrum or of the same order of magnitude as the two relatively high frequencies 8 and 12 of FIG. 1. The earth in the vicinity of transducer 16 is biased into the non-linear region, for example by loading it with weight 18. The seismic wave produced by transducer 16 and the low frequency subsonic seismic wave launched by the apparatus of FIG. 1 will be heterodyned within the earth in the vicinity of the seismic receiver of FIG. 2 to produce the usual modulation products. The tuned seismic transducer 17 is of similar structure to transducers 3, 10 and 16 but is operated as a receiver, that is, it picks up seismic waves from the earth and converts them into electrical signals of corresponding frequency. The electrical output of transducer 17 is applied to band-pass filter 21 which may be tuned to either the sum or difference frequency of the wave produced by transducer 16 and the received low frequency wave. Both the sum and difference frequencies will carry any modulation which was impressed on the low frequency subsonic wave at the transmitter of FIG. 1. The output of filter 21 is applied to amplifier 22 and thence to demodulator 23 wherein any intelligence thereon is removed. The locally generated seismic wave produced by transducer 16 is analogous to the local oscillator signal of a radio receiver.

It would of course be possible to generate a subsonic seismic wave by merely applying a subsonic electrical signal to a transducer which would convert it directly to a seismic wave of corresponding frequency. However the size and weight of electrical and electromechanical equipment varies inversely with the square of the operating frequency, therefore massive and unweildly equipment would be required in such a low frequency generator or receiver of seismic waves. On the other hand, the seismic transducers and the alternating current signal circuitry of the present invention operate at many times the frequency of the desired low frequency seismic wave and as a result will be compact in size and readily portable by hand.

The specific structure of the tuned seismic transducers 3, 10, 16, and 17 forms no part of the present invention, since the invention may be practiced with any transducer capable of converting electrical waves to seismic waves and vice versa. However, one type of transducer which has been successfully used in practicing this invention comprises a disc shaped metallic base 4 which rests on the earth as shown in FIG. 1. An electrical driver unit 7 is mounted at the top of a cylindrical sleeve 5 which is attached to the center of disc 4. The sleeve 5 includes a plurality of circumferential slots 6. The electrical driver 7 resembles that of a loudspeaker in which the signal current passes through a coil which is free to move in a magnetic field. In the transducers of FIGS. 1 and 2, the moving coil is attached to the top of the sleeve 5 and the pole pieces and permanent magnet for producing the magnetic field therefor are attached to a rod (not shown) inside and coaxial with sleeve 5 and also attached to the base 4. The slotted sleeve 5 is the equivalent of a stiff spring and acts as a mechanical impedance matcher or transformer for matching the impedance of electrical driver 7 to the impedance of the earth. A perfect match will be obtained at only one frequency and harmonics thereof, therefore the device is frequency sensitive and for this reason has been termed a tuned seismic transducer. The sleeve 6 will provide perfect impedance matching at the frequency at which its length is an integral multiple of one quarter of a wavelength of the frequency applied to the electrical driver 7. A more detailed description of the transducers of FIGS. 1 and 2 will be found in an article entitled "Communicating by Seismic Waves" in the magazine "Electronics" of April 12, 1963, on pages 51–55.

A seismic transducer of the type described designed for operation in the vicinity of 80 c.p.s. will stand about 15 inches in height and weigh about 40 pounds. Numerical examples of the frequencies involved in the seismic system herein disclosed are as follows: The signal source 8 may operate at 80 c.p.s. and signal source 12 at 79 c.p.s., thus producing a 1 c.p.s. beat note. At the receiver of FIG. 2, the signal source 19 may operate at 80 c.p.s. to produce sum and difference seismic waves of 81 and 79 c.p.s. respectively. The bandpass filter 21 may be tuned to either 79 or 81 c.p.s. These examples are illustrative only and should not limit the invention in any way. The two high frequency waves of the seismic transmitter of FIG. 1 will generally fall into the lower portion of the audio frequency spectrum and will differ by a subsonic frequency or by less than 20 c.p.s. Also, the "local oscillator" frequency of the seismic receiver of FIG. 2 will also be in the lower portion of the audio spectrum and will preferably be the same as one of the frequencies applied to the transmitter transducers.

While the invention has been described in connection with a preferred embodiment thereof, it should be understood that many modifications thereof are possible without departing from the inventive concepts disclosed herein, accordingly the invention should be limited only by the scope of the appended claims.

What is claimed is:

1. The method of producing subsonic frequency seismic waves, comprising the steps of, biasing a portion of the earth into the non-linear stress-strain region and heterodyning first and second seismic waves within said portion of the earth to produce as a modulation product of said heterodyning step a subsonic seismic wave having a frequency equal to the difference between the frequencies of said first and second seismic waves.

2. A method of detecting subsonic frequency seismic waves comprising the steps of biasing a portion of the earth into the non-linear stress-strain region, applying a locally generated seismic wave of sonic frequency to said portion of the earth, and detecting one of the modulation products resulting from the heterodyning within the earth of said subsonic frequency wave and said locally generated seismic wave.

3. The method of generating seismic waves of subsonic frequency comprising the steps of selecting a portion of the earth in which the strain does not vary linearly with the applied stress, and heterodyning first and second seismic waves within said portion of the earth to produce as a modulation product of said heterodyning step a subsonic seismic wave having a frequency equal to the difference between the frequencies of said first and second seismic waves.

4. The method of detecting subsonic frequency seismic waves comprising the steps of selecting a portion of the earth in which the strain varies non-linearly with the applied stress, applying a locally generated seismic wave of sonic frequency to said portion of the earth, and detecting one of the modulation products resulting from the heterodyning within said portion of the earth of said subsonic frequency wave and said locally generated seismic wave.

References Cited by the Examiner

UNITED STATES PATENTS

| 2,018,463 | 10/1935 | Muchow. |
| 2,235,089 | 3/1941 | Sparks _____ 181—0.5 |
| 2,418,156 | 4/1947 | Bollman. |
| 3,146,446 | 8/1964 | Novitzky. |
| 3,221,297 | 11/1965 | Smith et al. _____ 181—0.5 X |
| 3,252,129 | 5/1966 | McCullough et al. __ 181—0.5 X |

BENJAMIN A. BORCHELT, *Primary Examiner.*

M. F. HUBLER, *Assistant Examiner.*